United States Patent [19]

Wallace et al.

[11] 4,265,265

[45] May 5, 1981

[54] PNEUMATIC TOOL GOVERNOR

[75] Inventors: William K. Wallace, Barneveld; David A. Giardino, Deerfield, both of N.Y.

[73] Assignee: Chicago Pneumatic Tool Company, New York, N.Y.

[21] Appl. No.: 73,716

[22] Filed: Sep. 10, 1979

[51] Int. Cl.³ ............................................. G05D 13/12
[52] U.S. Cl. ........................................ 137/56; 418/41
[58] Field of Search ............... 137/56; 173/12; 418/41

[56] References Cited

U.S. PATENT DOCUMENTS

| 1,506,862 | 9/1924 | Parsons | 418/41 |
| 1,674,579 | 6/1928 | Van Hamersveld | 173/12 |
| 1,723,589 | 8/1929 | Van Hamersveld | 418/41 X |
| 3,159,254 | 12/1964 | Weir | 137/56 X |
| 3,535,982 | 10/1970 | Snider | 137/56 X |

FOREIGN PATENT DOCUMENTS 885621 12/1961 United Kingdom .

Primary Examiner—Robert G. Nilson
Attorney, Agent, or Firm—Stephen J. Rudy

[57] ABSTRACT

A pneumatic tool governor having a body rotatable with the rotor of the tool, the body being provided with holes for passage of motive fluid to the motor of the tool, and a centrifugally responsive valve element pivotally mounted upon the governor body so that the fluid conducting holes are progressively blocked as tool rotary spped increases to the point where rotary speed attains a predetermined value.

5 Claims, 5 Drawing Figures

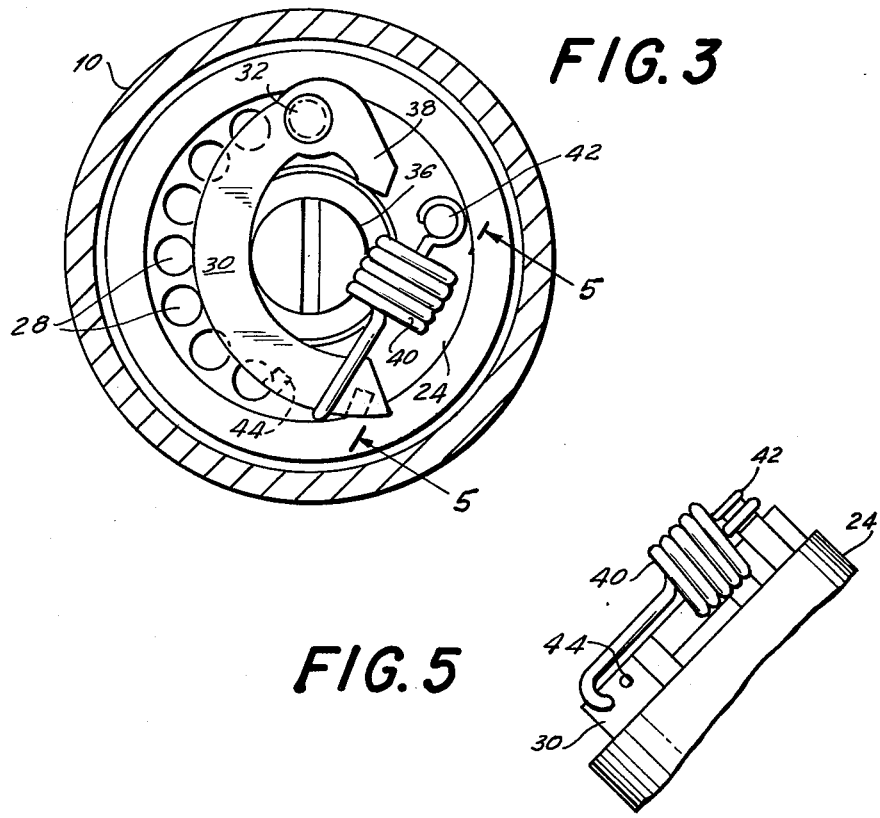
FIG. 3
FIG. 5
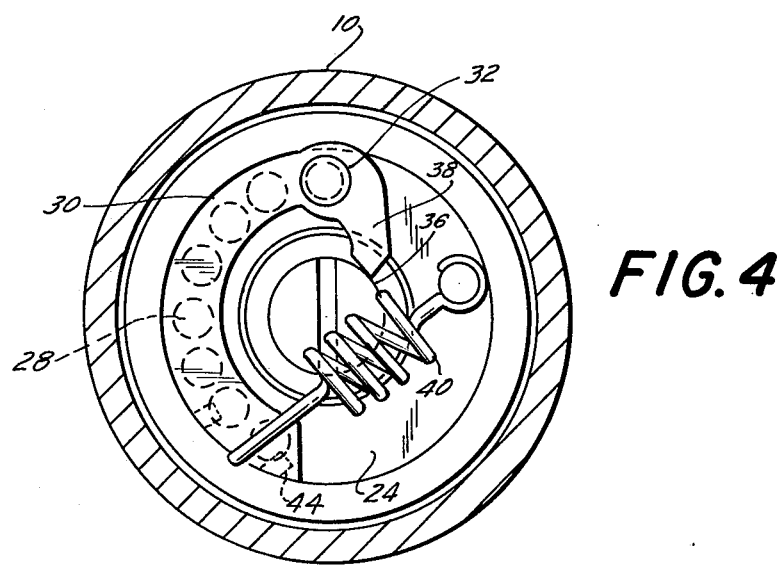
FIG. 4

PNEUMATIC TOOL GOVERNOR

BACKGROUND OF THE INVENTION

This invention relates to a governor for use in a pneumatically powered hand held tool.

Various types of governors for use in such tools have been proposed and utilized with varying degrees of success. The governor of the subject invention employs a weighted valve element which is pivotally arranged at one end, and caused to move by centrifugal force to progressively cover a plurality of holes positioned to conduct motive fluid to the motor.

Such types of governors are exemplified in prior art U.S. Pat. Nos. 1,506,862 issued Sept. 2, 1924 to F. W. Parsons, 1,674,579 issued June 19, 1928 to J. J. N. Von Hamersveld, and 3,535,982 issued Oct. 27, 1979 to P. A. Snider. The subject invention distinguishes over these governors primarily in simplicity of structure, easy control adjustment, ruggedness and durability, as well as space minimization.

In the drawings:

FIG. 3 is a section view as seen from line 3—3 in FIG. 1, and showing arrangement of certain parts in non-operating condition of the tool;

FIG. 4 is the same as FIG. 3 but showing the parts in operating condition of the tool; and FIG. 5 is a partial side view of the governor as seen from line 5—5 in FIG. 3.

Figure 1:
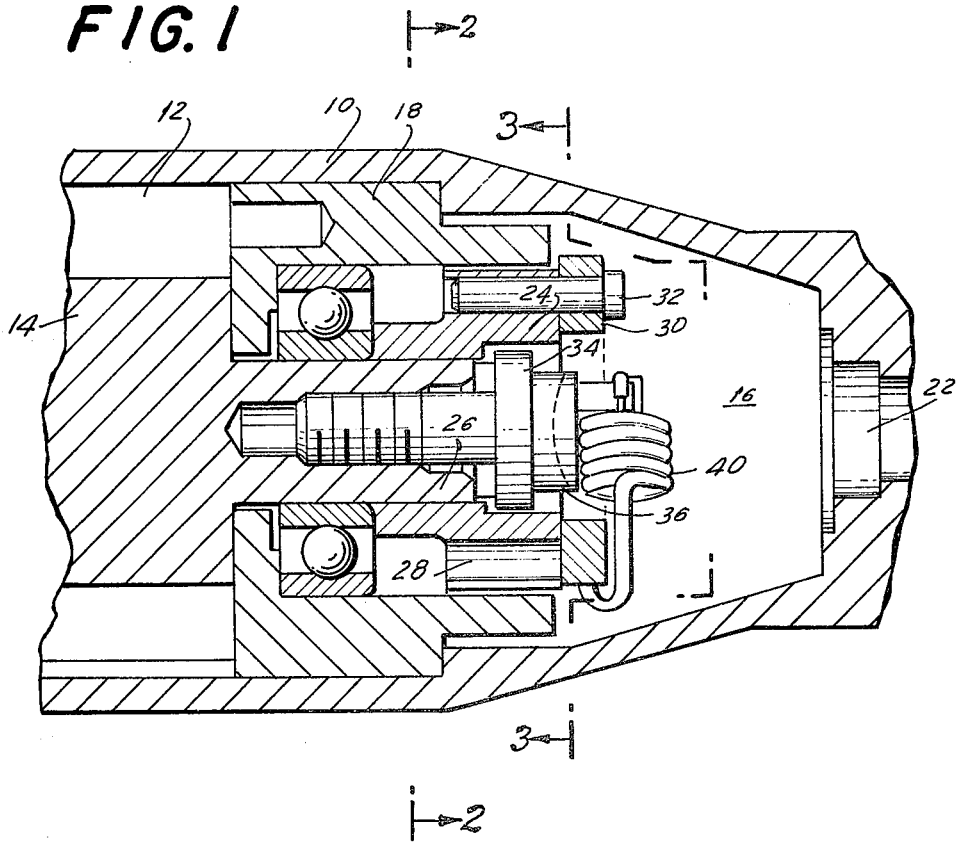
FIG. 1 is a partial longitudinal view of a pneumatic powered tool including a side view of a governor embodying the principles of the invention.
Figure 2:
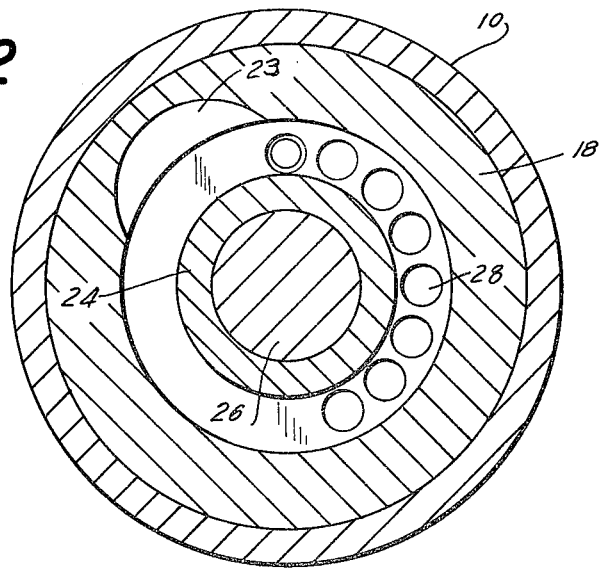
FIG. 2 is a section view as seen from line 2—2 in FIG. 1.

Referring now to FIGS. 1 and 2, a housing 10 of a hand held grinder, encloses a motor cavity 12 wherein is arranged a standard type sliding vane motor 14, and a governor cavity 16, defined between an end plate 18, and a handle portion 20 of the tool provided with an air inlet passageway 22. The end plate 18 has a port 23 arranged for flow of compressed air to the motor 14 for operation thereof.

A governor body 24 affixed to a rotor 26 of the motor 14 for rotation therewith, has a plurality of longitudinal holes 28 which conduct compressed air from the cavity 16 to the port 22.

As best seen in FIG. 2, the holes 28 are of the same diameter and are radially spaced an equal distance from the axis of the rotor 26, all the holes being clustered substantially in two contiguous quadrants of the governor body 24. The use of a plurality of holes allows for more sensitive speed control because air flow can be regulated in small increments.

As best seen in FIGS. 3 and 5, an acurate valve element 30 is pivotally affixed to the governor body 24 by a pin 32, so that a major portion of the valve element may move to progressively cover the holes 28. A screw 34 secured to the rotor 26, has a head portion 36 which serves as a stop for a hook end portion 38 of the valve element 30 (FIG. 4) as well as the mid portion thereof (FIG. 3).

A helical spring means 40 has one end affixed to a pin 42 secured to the governor body 24, and the other end to valve element 30 where it may be anchored in one or more holes 44.

The operation of the governor arrangement above disclosed should be easily understood. When the rotor obtains desired speed, the governor element 30, will be centrifugally moved from initial position (FIG. 3) wherein most of the holes 28, are uncovered, toward final position (FIG. 4) wherein all the holes are covered. In actual operation, the force of spring 40 is adjusted so that a predetermined portion of holes 28 are covered to attain and maintain desired rotor speed under given work load during tool operation.

Should for any reason the rotor speed exceeds predetermined speed, the governor element 30, will be centrifugally moved to cover all holes 28, thus immediately causing blocking of air flow resulting in a decrease or cessation of motor operation. As the rotor speed is thus decreased, the spring 40 will move the valve element progressively out of blocking coverage of the holes 28, until desired tool speed is realized. The tension, on force of spring 40, may be regulated by selection of the proper hole 44, for anchoring the end of the spring. When the spring is positioned in the hole (44) toward the free end of the valve, the spring is at minimum load, and the moment arm is at maximum. This resultant moment is less than the condition when the spring is in the hole closer to the pivot. This is because the spring is now at maximum load because the distance from the pivot to this hole is greater. Although the moment arm is shorter the product of the two is a higher value than in the first instance.

The governor arrangement of the invention, may be utilized in other types of pneumatically powered tools in addition to the hand held grinders disclosed, such as vertical hand held grinders, and other rotatable power tools, or mechanisms, whether hand held or mounted in a stationary tool at a work station.

In any case, the simplicity of design, and attendant advantages hereinbefore mentioned, will be readily apparent from the foregoing disclosure.

What is claimed is:

1. A governor for a pressurized medium powered tool, said governor including a body member coupled for rotation with a rotor of the tool, a plurality of holes formed in the body member for conduction of pressurized medium to the motor of the tool for operation thereof, an arcuate valve element pivotally mounted upon the body member and responsive to centrifugal force to progressively cover portions of the holes in the body member, a spring means arranged to resist centrifugal movement of the value element, a screw centrally secured to the end of the rotor and coaxial with the axis of rotation of the rotor, said valve element being arranged to abut said screw when the element is rotated a given amount in either direction of rotation.

2. In a governor in accordance with claim 1, wherein the valve element has a hook end portion which is arranged to abut the screw to limit maximum amount of rotary movement relative to the body member.

3. In a governor in accordance with claim 2, wherein said body member holes are arranged at equal distance from the axis of the rotor, and are clustered in two contiguous quadrants of the body member.

4. In a governor in accordance with claim 3, wherein said spring means has one end fixed to the body member and the opposite end to the valve element.

5. In a governor in accordance with claim 4, wherein the valve element has a plurality of holes which can be selectively used to anchor the end of the spring means to the valve element.

* * * * *